United States Patent
Winkler et al.

(10) Patent No.: US 8,606,879 B2
(45) Date of Patent: Dec. 10, 2013

(54) METHOD FOR SUPPORTING MANAGEMENT AND EXCHANGE OF DISTRIBUTED DATA OF USER OR AN ENTITY

(75) Inventors: Florian Winkler, Heidelberg (DE); Joao Girao, Ludwigshafen (DE); Hugo Santos, Heidelberg (DE); Joao Dá Silva, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 214 days.

(21) Appl. No.: 13/256,005

(22) PCT Filed: Mar. 12, 2010

(86) PCT No.: PCT/EP2010/001587
§ 371 (c)(1),
(2), (4) Date: Oct. 24, 2011

(87) PCT Pub. No.: WO2010/102834
PCT Pub. Date: Sep. 16, 2010

(65) Prior Publication Data
US 2012/0042042 A1    Feb. 16, 2012

(30) Foreign Application Priority Data
Mar. 12, 2009 (EP) .................................... 09003600

(51) Int. Cl.
*G06F 15/16* (2006.01)
(52) U.S. Cl.
USPC .......................................... 709/217; 709/220
(58) Field of Classification Search
USPC .................. 709/229, 226, 223; 713/152, 175; 717/172, 106
See application file for complete search history.

(56) References Cited

U.S. PATENT DOCUMENTS

| 7,594,112 | B2 * | 9/2009 | Patrick et al. ................. 713/166 |
| 7,594,224 | B2 * | 9/2009 | Patrick et al. ................. 717/172 |
| 7,603,547 | B2 * | 10/2009 | Patrick et al. ................. 713/152 |
| 7,603,548 | B2 * | 10/2009 | Patrick et al. ................. 713/152 |
| 7,644,432 | B2 * | 1/2010 | Patrick et al. .................... 726/1 |
| 7,698,398 | B1 * | 4/2010 | Lai ............................... 709/223 |
| 7,831,693 | B2 * | 11/2010 | Lai ............................... 709/220 |
| 7,836,289 | B2 * | 11/2010 | Tani ............................. 712/241 |
| 7,836,298 | B2 | 11/2010 | Gross et al. |

(Continued)

FOREIGN PATENT DOCUMENTS

CN    101341492 A    1/2009

OTHER PUBLICATIONS

International Search Report dated Jul. 12, 2010, corresponding to the PCT application.

(Continued)

*Primary Examiner* — Tammy Nguyen
(74) *Attorney, Agent, or Firm* — Young & Thompson

(57) ABSTRACT

A method for supporting management and exchange of distributed data of a user or an entity, in particular user profile information data, is characterized in that a protocol is provided that employs SAML (Security Assertion Markup Language) as bearer protocol in such a way that SAML messages function as containers for DST (Data Service Template) or DST-like messages in order to compose SAML DST messages, wherein the DST or DST-like messages include data processing information, and wherein for the DST or DST-like messages unified protocol namespaces are defined as the protocol specific namespaces.

30 Claims, 5 Drawing Sheets

(56) References Cited

U.S. PATENT DOCUMENTS

Figure 1:
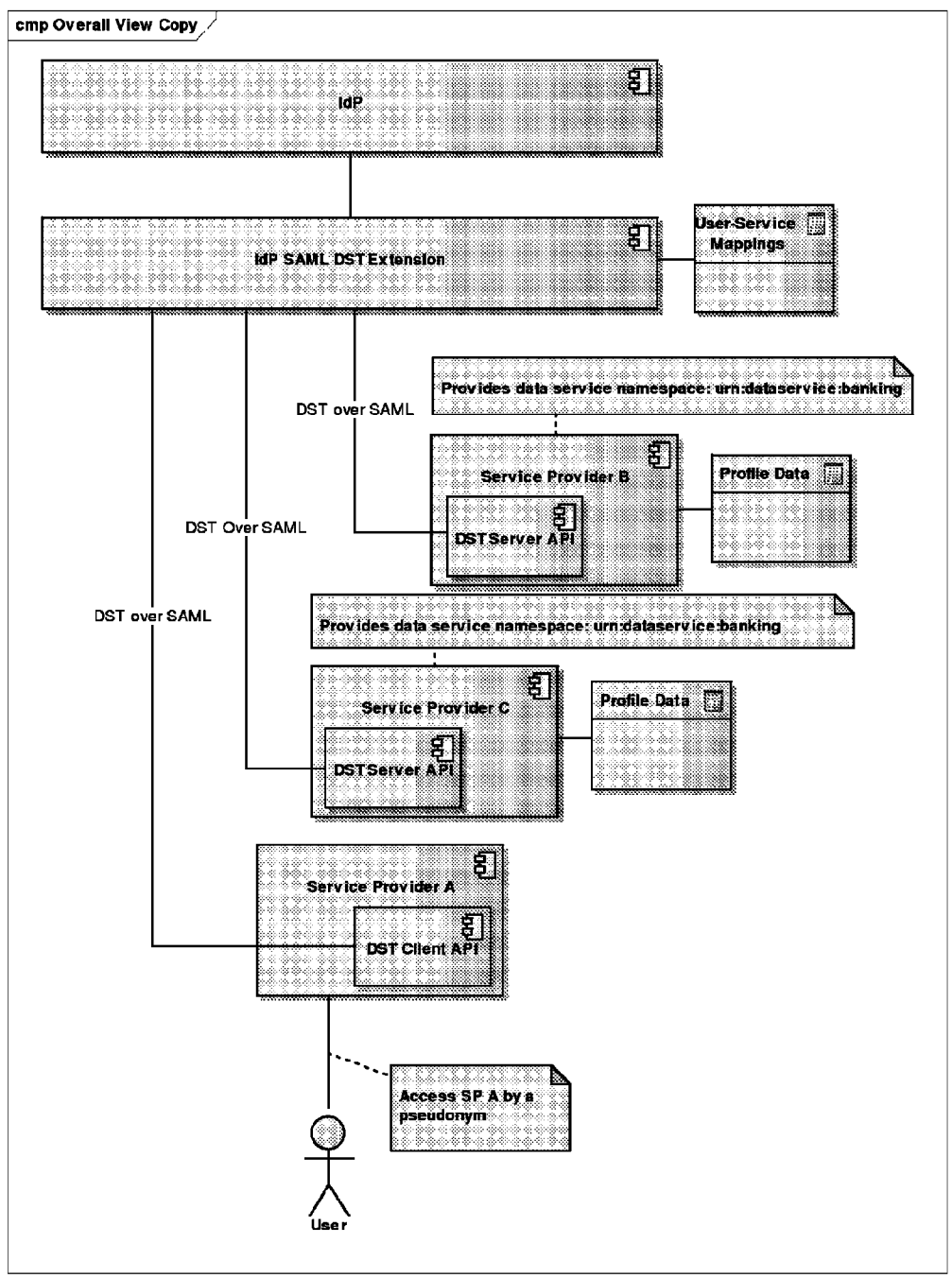

| | | | | |
|---|---|---|---|---|
| 7,953,979 | B2* | 5/2011 | Borneman et al. | 713/175 |
| 8,069,435 | B1* | 11/2011 | Lai | 717/106 |
| 8,234,387 | B2* | 7/2012 | Bradley et al. | 709/229 |
| 8,346,929 | B1* | 1/2013 | Lai | 709/226 |
| 8,375,213 | B2* | 2/2013 | Borneman et al. | 713/175 |
| 8,452,881 | B2* | 5/2013 | Boubez et al. | 709/229 |

OTHER PUBLICATIONS

3rd Generation Partnership Project; Technical Specification Group Core Network and Terminals; 3GPP Generic User Profile; No. V8.0.0; Dec. 1, 2008 pp. 1-73; XP050372722.

"SAML XPath Attribute Profile"; Oasis; Aug. 30, 2005, pp. 1-9; XP002588047.

S. Saklikar; "User Privacy-Preserving Identity Data Dependencies"; Nov. 3, 2006; pp. 45-54; XP040050487.

ESTI, "Telecommunications and Internet converged Services and Protocols for Advanced Networking (TISPAN); Network and Service Management; Subscription Management; Part 3: Functional Architecture", ESTI Standard, Mar. 18, 2008, ESTI TS 188 002-3, pp. 1-33.

Translation of Japanese Office Action, dated Oct. 30, 2012, from corresponding JP application.

Miyata, Teruko, "Standardization Movement in Liberty Alliance", Japan, NTT Gijyutsu Journal, Mar. 2006, pp. 87-89.

Japanese Office Action, dated Aug. 19, 2013, from corresponding JP application.

Chinese Office Action, dated Aug. 20, 2013, from corresponding CN application.

* cited by examiner

METHOD FOR SUPPORTING MANAGEMENT AND EXCHANGE OF DISTRIBUTED DATA OF USER OR AN ENTITY

The present invention relates to a method for supporting management and exchange of distributed data of a user or an entity, in particular user profile information data.

With an abundance of services available on today's and future Internet, each requiring the creation of accounts, authentication and storage of user profile data, users are confronted with the fact that their profiles are spread among a variety of different service providers, e.g. banks, bookstores or community services like YouTube and Facebook.

Identity Management (IdM) aims at providing single sign on (SSO) and secure and privacy-aware exchange of user (profile) information between service providers (SPs) and Identity Providers (IdPs). A user's information can be stored by an Identity Provider or at so-called Attribute Authorities which can be queried by the Identity Provider for user data in order to hand them out to requesting SPs.

Furthermore most service providers currently store the profile data that are part of their service definitions in a proprietary format where each data field has a proprietary name and associated semantics. This means that even if Identity Management provides means for reading distributed data from various Attribute Authorities, there is always the requirement of mapping data identifiers and/or semantics between service provider domains. This is tedious, often impossible and, if not done, may result in a tight coupling between profile data consumers and those authorities that provide it.

Users that want to profit from Identity Management solutions will want to be in control of their distributed profile data and thus need a means of managing it in a convenient way. This will include the modification and query just as much as the protection by access control policies and the ability to have a clear overview of what personal data is stored where.

Additionally, not only users will be interested in managing distributed profiles and data, but also SPs will be interested in providing services that include such manipulation. At the same time, however, SPs providing user profile data will not be willing to give up control over it, which requires a solution that allows SPs to verify/assert requesting parties and enforce their own access control before handing out data or allowing manipulation.

Finally, an infrastructure supporting the management of distributed user profiles will have to provide mappings between user identifiers of different service provider domains to make sure that users who are identified and linked to a specific profile in one SP's domain can be identified by a (most likely) different name in another SP's domain. This is a property that is an inherent part of nowadays' identity management solutions and one of the cornerstones of privacy protection.

SAML 2.0 is an XML-based markup language developed by the OASIS consortium. It supports Single Sign On, distributed transactions and assertion-based authorization across different security domains. Several protocol bindings are defined that allow SAML to be used for plain HTTP services as well as Web Services, i.e. over SOAP (Simple Object Access Protocol) and SIP (Session Initiation Protocol).

The use of SAML for SSO in combination with 3GPP's IP Multimedia Subsystem (IMS) was presented in "*Identity Management for IMS-based IPTV*", IEEE Globecom 2008. Moreover, Liberty Alliance adopted SAML for their IdM solutions. Thus, SAML constitutes a de facto standard for exchanging IdM-related information in an enterprise environment.

SAML defines several request and response types, e.g. to query for identity attributes or to exchange assertions about requesting and responding parties. Furthermore, SAML messages can carry identifiers of virtual user identities. Within this document those identifiers are referred to as pseudonyms, since they can be used to hide a user's real identity. It is important to note, that pseudonyms can be domain specific, meaning that the same user can be identified by different pseudonyms in different service provider domains.

SAML is for read-only access, and does neither allow users, nor Identity Providers or SPs to manage, i.e. write or modify, profile information in any way.

Another possible message format exists which is Liberty Alliance's Data Services Template (DST) specified under https://www.projectliberty.org/resource_center/specifications/liberty_alliance_id_wsf_data_services_template_v2_0_specifications. DST is the specification of a protocol template defining the structure of XML-based messages that carry information for management (creation, deletion, modification and query) of profile data. DST assumes that profile data is accessible in XML structure and uses XPATH expressions to select nodes of profile data that are subject to processing.

As its name suggests, DST is not a protocol but a template of protocol messages which—as stated by the specification—is meant to be implemented by each data service individually. Implementation includes the definition of a data service-dependent namespace both for the protocol messages and the data that are to be managed with DST. This, however, renders DST completely dependent on the profile data service that implements it, which neither makes it unified nor allows decoupling of DST clients and servers. In fact, it binds the instance of the protocol template to the data service.

There are currently no means to manage and modify distributed profile data in a secure and privacy-aware way, meaning that a user will have to access individual services to update a part of his profile information.

It is therefore an object of the present invention to improve and further develop a method of the initially described type for supporting management and exchange of distributed data of a user or an entity, in particular user profile information data, in such a way that, by employing mechanisms that are readily to implement, a user or entity is enabled to manage and/or modify its distributed data in a secure and privacy-aware way.

In accordance with the invention, the aforementioned object is accomplished by a method comprising the features of claim 1. According to this claim such a method is characterized in that a protocol is provided that employs SAML (Security Assertion Markup Language) as bearer protocol in such a way that SAML messages function as containers for DST (Data Services Template) or DST-like messages in order to compose SAML DST messages, wherein said DST or DST-like messages include data processing information, and wherein for said DST or DST-like messages unified protocol namespaces are defined as the protocol specific namespaces.

According to the invention it has first been recognized that in the context of providing secure, privacy and identity aware management and exchange of distributed user data an enormous improvement can be achieved by combining SAML and DST in a specific way. The combination of SAML and DST is realized by providing a protocol that employs SAML as bearer protocol in such a way that SAML messages function as containers for DST or DST-like messages in order to compose SAML DST messages. The DST or DST-like messages include the data processing information for managing the distributed data of the user or entity. Further it has been recognized that the provided protocol can be independent of the managed data by defining for the DST or DST-like messages unified protocol namespaces as the protocol specific namespaces. Thus, these namespaces are bound to the protocol messages itself and may be distinguished from other namespace declarations inside the DST messages that might be used to reference elements of the actual distributed data that is changed, i.e. modified and/or managed. Thus, the method according to the invention enables managing and modifying of the distributed data by the user or entity in a secure and privacy-aware way.

According to a preferred embodiment the SAML DST messages may include an element functioning as container—container element—for carrying a single DST or DST-like message. Thus, it is possible to define a new SAML message type that derives from existing abstract SAML message types and that may inherit all the features of SAML but additionally can act as a container for a DST or DST-like message. It is to be noted that also existing SAML messages may be reused as bearer protocol that functions as container for DST or DST-like messages.

According to a preferred embodiment a SAML DST message may involve a SAML DST request message or a SAML DST response message.

Advantageously, a SAML DST request message may include a DST or DST-like request which is answered by a DST or DST-like response that is included in a SAML DST response message.

According to a preferred embodiment the SAML DST request messages include an element that functions as subject field for identifying the user or entity whose data is subject to the DST processing specified in the DST or DST-like message contained in the SAML DST request message. Thus, the subject field can be used for identifying the user. A requesting service, that wants to retrieve information about a user via e.g. an Identity Provider and uses DST, may employ the subject field to specify to the Identity Provider for which user it is trying to fetch information. This subject identifier can be the pseudonym that is used at the requesting service.

Advantageously, the SAML DST request messages may include an element that functions as issuer field for identifying the originator of the SAML DST request messages.

Furthermore, the SAML DST request messages may include an element that functions as recipient field for sending the SAML DST request messages to a specific destination, in particular a specific data service. For example, the recipient field may be employed for a recipient service provider ID that can either be an endpoint URL (Uniform Resource Locator) or a service provider pseudonym which can be resolved by an Identity Provider.

Each of the SAML DST request messages may exactly include one container element that constitutes the DST or DST-like request.

With respect to DST processing, the DST or DST-like requests may carry, in particular XML-based, data processing information regarding the creation, modification, deletion or query of the distributed data. The type of the DST processing is not given as a specific message field. The type can be inferred from the RequestType as defined by the DST specs. This may be one of ModifyRequest, CreateRequest, DeleteRequest or QueryRequest.

Advantageously, the semantics of the DST or DST-like requests regarding the creation and/or deletion processing is constructed in such a way that the effect of the requests is limited solely to the creation and/or deletion of data within a data record of the distributed data of a user or entity, e.g. within a user profile.

Each of the DST or DST-like requests may include a select statement, wherein the select statement holds an XPATH expression for indicating which part of the distributed data has to be processed.

The XPATH expression may be handed on to the prospective recipient of the DST or DST-like requests, in particular to the data service that is supposed to return information based on the XPATH expression, for example a XPATH query.

Advantageously, it may be provided that a namespace being defined in the DST or DST-like requests and not being one of the protocol specific namespaces is used inside the XPATH expression for referencing elements of the distributed data. This namespace may be used by a Identity Provider to distinguish which kind of information is about to be requested for the user and which data service provider has to be contacted. For example, the Identity Provider may keep a mapping of the namespace of the profile data service to the namespace of profile data (i.e. type) that this service provides. This mapping may be kept for each user.

Furthermore, the SAML DST response messages may include an element that functions as status field indicating the status of the SAML DST response message.

Advantageously, the SAML DST response messages may include an element that functions as retry subject field for holding information about a subject name that will be used inside a retry request. This is needed in the case that subject identifiers are mapped by an Identity Provider in an ad hoc manner between domains.

Each of the SAML DST response messages may include one or more container elements including the DST or DST-like responses. The necessity to have several container elements inside a SAML DST response may be due to the potential requirement that the Identity Provider can accumulate several DST or DST-like responses into a single SAML DST response.

The one or more container elements included by the SAML DST response messages may include an identifier that is used for referring to the issuer of a DST response. This identifier can for example be used by a requesting service provider to contact a specific serving service provider in case of unsuccessful or unexpected responses. If a specific DST response indicates failure, the requesting client can send another request just to the one service provider that failed the DST message. The identifier can further be used to indicate to a user which service providers responded how, e.g. in a distributed user profile management user interface.

Advantageously, the SAML DST messages may include a signature element containing the result of signing the SAML DST messages.

SAML DST messages may be exchanged between requesting and serving service providers in order to manage the distributed data of the user or the entity.

Furthermore, an Identity Provider may be involved in the exchange of the SAML DST messages between requesting and serving service providers.

Advantageously, the user or the entity may access a service provider by a pseudonym identifier, wherein the Identity Provider is employed by service providers for resolving the pseudonym identifier and/or mapping it to the local user account.

A requesting service provider may send a SAML DST request message including the pseudonym identifier of the user or the entity as subject and a DST or DST-like message to the Identity Provider.

Moreover, the Identity Provider may create a temporary pseudonym identifier being valid at both the requesting and the serving service providers.

Advantageously, the Identity Provider may respond to the requesting service provider with a SAML DST retry message indicating the temporary pseudonym identifier.

Additionally or alternatively the Identity Provider may substitute the pseudonym identifier for the temporary pseudonym identifier inside the SAML DST message.

The requesting service provider may send a new SAML DST request message including the temporary pseudonym as subject and the DST or DST-like message to the Identity Provider.

Advantageously, the Identity Provider may look up which service providers are able to serve the DST or DST-like requests that affect the type of the distributed data, in particular user profile information data, specified in the DST or DST-like requests and forwards the SAML DST request message to the serving service providers.

The serving service providers may respond with SAML DST response messages to the Identity Provider, wherein the Identity Provider accumulates the DST or DST-like responses included in the SAML DST response messages of the serving service providers and returns a SAML DST response message containing the accumulated DST or DST-like responses to the requesting service provider.

In a preferred embodiment, it may be provided that the Identity Provider may be used as discovery server for a requesting service provider to discover serving service providers. The Identity Provider may check the signature of a SAML DST request message sent from the requesting service provider. Subsequently the Identity Provider may look up which service providers are able to serve the DST or DST-like requests that affect the type of the distributed data, in particular user profile information data, specified in the DST or DST-like requests. The Identity Provider may create a temporary pseudonym identifier and substitutes the subject in the SAML DST request message for the temporary pseudonym—changed request—. Finally, the Identity Provider signs the changed request and sends a SAML DST response message containing the changed request and Uniform Resource Identifiers of the looked up serving service providers to the requesting service provider.

Advantageously, the requesting service provider may re-sign the changed request and sends the re-signed changed request to the looked up serving service providers.

Figure 2:
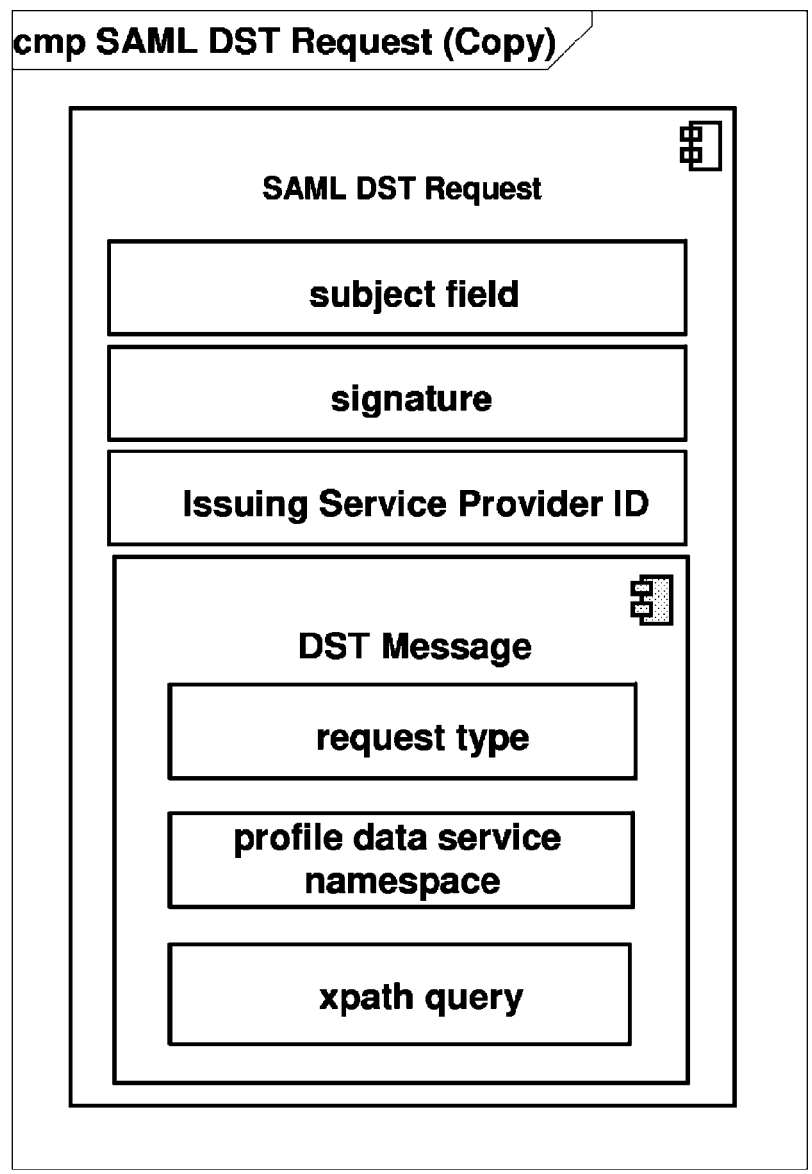
Figure 3:
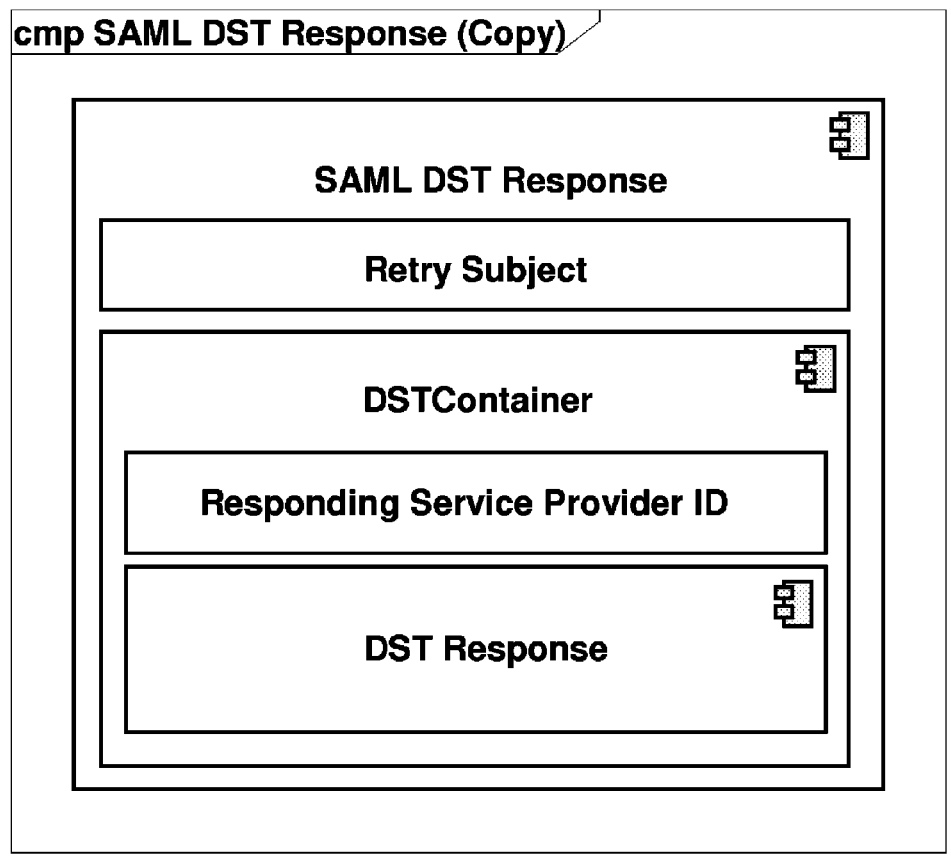
Figure 4:
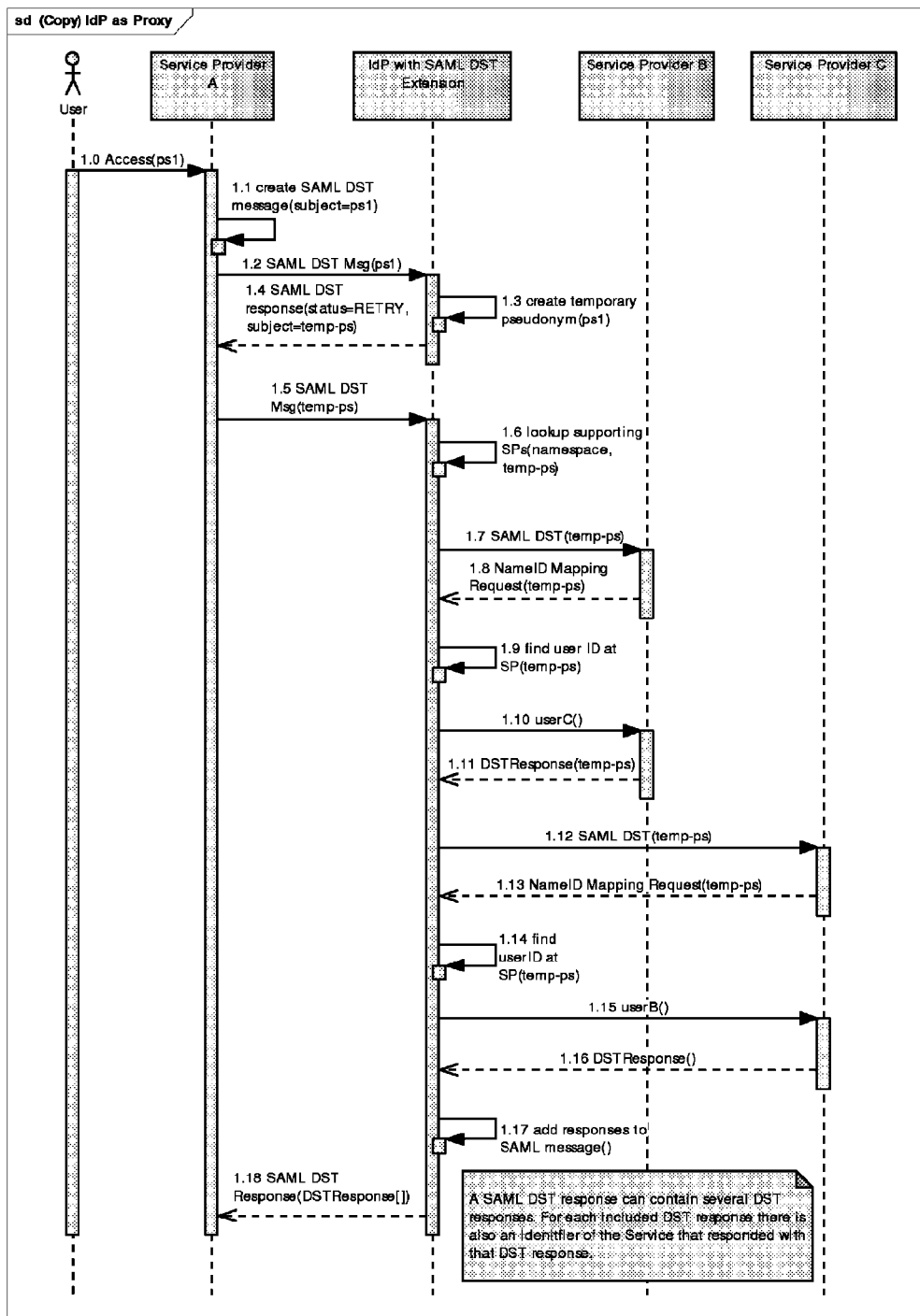
Figure 5:
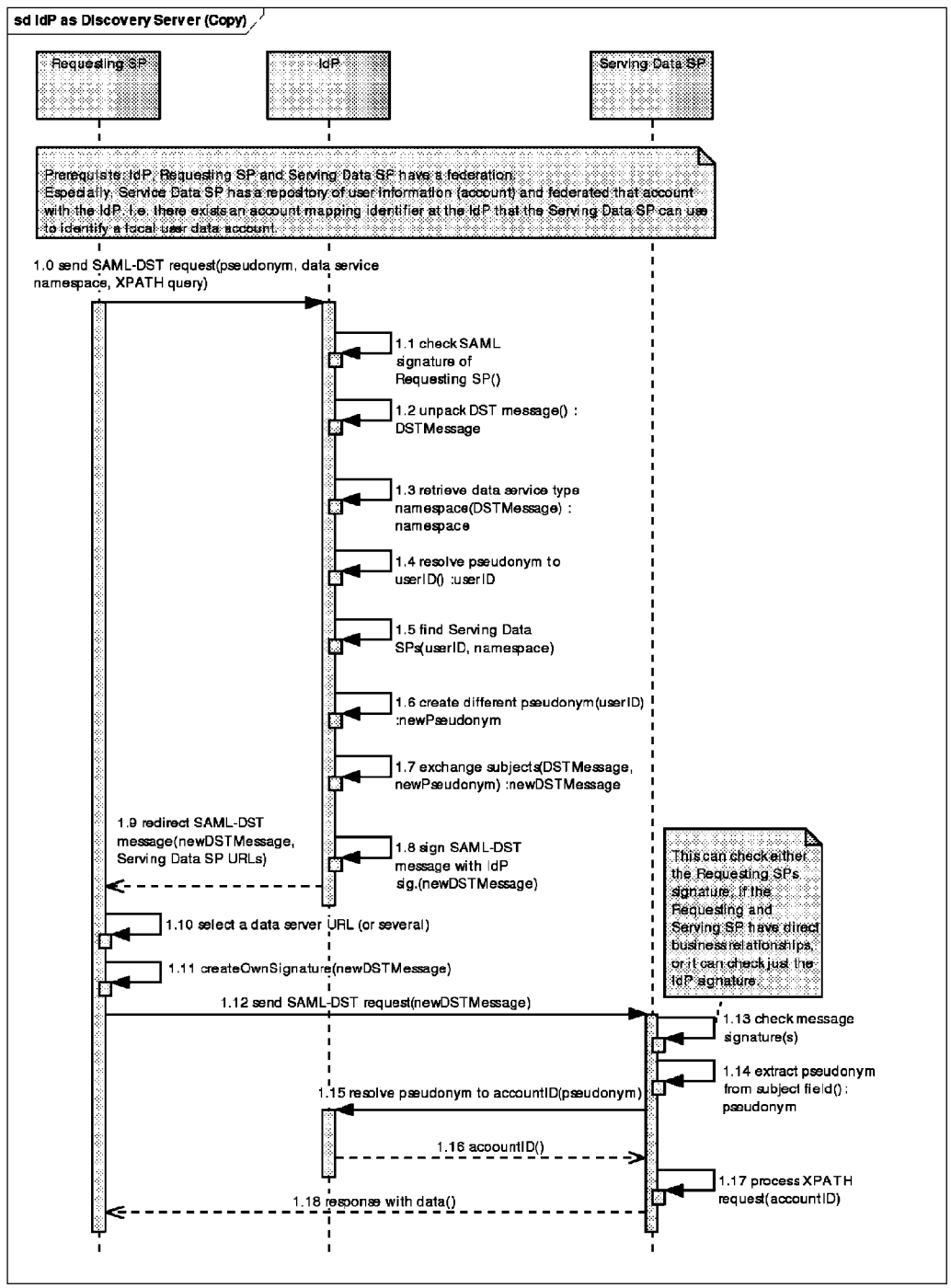

There are several ways how to design and further develop the teaching of the present invention in an advantageous way. To this end, it is to be referred to the patent claims subordinate to patent claim 1 on the one hand, and to the following explanation of preferred examples of embodiments of the invention illustrated by the drawings on the other hand. In connection with the explanation of the preferred example of an embodiment of the invention by the aid of the drawings, generally preferred embodiments and further developments of the teaching will be explained. In the drawings FIG. 1 is a schematic SAML DST infrastructure overview illustrating an example of an application scenario of a method according to the present invention, FIG. 2 is a schematic view illustrating a SAML DST request message according to an embodiment of the present invention, FIG. 3 is a schematic view illustrating a SAML DST response message according to an embodiment of the present invention, FIG. 4 is a sequence diagram illustrating example message flows for the case that the Identity Provider acts as a SAML DST proxy, and FIG. 5 is a sequence diagram illustrating example message flows for the case that the Identity Provider acts as discovery server for a requesting service provider to discover possible serving service providers.

FIG. 1 shows an overview of the infrastructure and components that are envisaged for a method according to the present invention in order to enable management of distributed user profiles and IdM-sensitive data. Users will access service providers by a given pseudonym as is a common case for IdM scenarios. With the help of an Identity Provider, the pseudonym can be resolved by the SPs and mapped to local user accounts, e.g. to provide single sign on. When a service provider needs to access and/or manipulate the user's profile information that is not available locally, it will send a SAML DST request to an extension point of the Identity Provider containing itself as the issuer of the request, the user's pseudonym as the message's subject and an indication of what kind of profile data is affected.

The Identity Provider, acting as a SAML DST proxy, is then responsible for identifying the SPs that host the requested kind of profile information for the given user and for creating a mapping between the pseudonym of the user at the requesting SP and the user identifiers used at the serving SPs. After doing so, the Identity Provider forwards the request to all SPs that can serve the request for the user. The serving SPs, which hold the profile information of the user can check the validity of the request, including the Identity Provider's signatures and assertions and then process the DST request sent inside the SAML message.

Processing of the request can include the enforcement of access and security policies proprietary to each individual SP. This is to make sure that the manipulation or hand out of profile data is granted. After processing, each serving SP sends back a SAML DST response to the Identity Provider which accumulates the results in a single SAML DST response including information about which SP was sending which response. The accumulated responses are then sent back to the requesting SP.

In order to provide the infrastructure as described in the application scenario of FIG. 1, DST is modified. DST modifications, which will be explained in more detail in the following, are referred to as DST-like messages. Generally, it is important to note that DST is a template, not a protocol and usually bound by namespaces to the data service that provides DST as an interface. An implementation of DST requires the definition of three namespaces, one for the utility XML elements, one for XML DST base messages and one for the DST reference implementation schema.

In order to overcome the limitation of proprietary and thus binding namespaces, unified protocol namespaces are defined for DST messages to be the following:
1) urn:eu:neclab:nw:util:2009-02 for utility elements
2) urn:eu:neclab:nw:dst:2009-02 for DST base messages
3) urn:eu:neclab:nw:dst:2009-02:ref for the DST reference implementation schema.

By defining them as the protocol specific namespaces, it is possible to distinguish them from other namespace declarations which can now be used to indicate different kinds of profile data types that are subject to DST processing.

```
<ns3:Query xmlns:ns1="urn:eu:neclab:nw:util:2009-02"
    xmlns:ns2="urn:eu:neclab:nw:dst:2009-02"
    xmlns:ns3=" urn:eu:neclab:nw:dst:2009-02:ref"
    xmlns:bp="urn:banking:profile:service">
    <ns3:QueryItem>
        <ns3:Select>/bp:Banking/bp:Accounts</ns3:Select>
    </ns3:QueryItem>
</ns3:Query>
```

E.g. the XML sample above depicts a simple DST query request that retrieves all bank accounts of a user. It is noted that the Select statement contains an XPATH query using a namespace that is not the protocol namespace but a namespace defined additionally to indicate the type of user profile that is being queried. In original DST, this is not foreseen. The namespace urn:banking:profile:service in the sample above references a schema-defined banking profile. As already started by Liberty Alliance, it is assumed there will be more standardized profile schemas, e.g. for banking data, personal profile data, etc. with well-defined element names and defined data semantics. Each of those profile types will be well defined, following a given structure and specifying which data are contained inside profiles of that specification. This will make it possible to retrieve a specific kind of information with well defined semantics and in a standardized way. The method according to the invention is independent of the type of profile that might be manipulated and therefore will enable broad interoperability between SPs.

Furthermore, the semantics of DST's Create and Delete messages are slightly changed. In the Liberty Alliance's Data Services Template specification, Create and Delete messages are used to create and delete entire data records, in the terminology according to the present invention, entire profiles or accounts. To create or delete data within a profile, Modify requests are used. Those semantics are changed by limiting the effect of Create and Delete messages solely to the creation and deletion of data within a specific profile. This is done, because it is assumed that SPs have to be in full control of the creation and deletion of entire profiles/accounts and since the protocol becomes easier and cleaner thereby. This change in semantics requires the addition of a Select statement to the Create message to indicate with an XPATH expression where inside a profile new data should be created.

Profile data, or data services as they are referred to as in DST, are supposed to be represented in XML structure. This does not mean that the data for DST processing can only be XML structured data, but there will have to be an abstraction layer for whatever data is to be processed by the method according to the present invention that exposes the data as if it is XML-structured.

DST messages are unaware of the user (subject) whose profile data are affected by the request. Furthermore they do not carry any information that could be used to assert the requesting party or validate message integrity. Finally, there is no means of providing Identity Management within DST messages. That functionality has to be provided by the bearer protocol, i.e. the protocol carrying DST messages. SAML 2.0 is the de facto standard for enterprise IdM solutions. SAML 2.0 is a well-understood protocol and already widely used. In order not to affect existing technology, it is chosen to extend the SAML protocol by defining a new request and response type.

FIG. 2. is a schematic view illustrating a SAML DST request message according to an embodiment of the present invention. The illustrated SAML DST request is a new type that is derived from SAML's SubjectQueryAbstractType. By deriving from an existing request type it is ensured that the benefits and properties of SAML messages are kept that are needed for Identity Management, e.g. message signatures, security, subjects, etc. Thus, a SAML DST request contains a subject field that identifies a user, an issuer field that can be used to identify the originator of the request, and a signature element containing the result of message signing.

As illustrated in FIG. 2, a new element which contains the DST request is additionally defined. Using SAML DST, a requesting SP can exactly specify whose user profile—given by the subject—should be affected by the DST request sent inside the SAML message. Moreover, since SAML supports the exchange of identifier mapping messages, it is possible that the subject identifier is a pseudonym of the user, and thus not only hides the user's real identity but also allows for user identifier mapping between service provider domains. This is one of the prerequisites of true cross-domain applicability.

FIG. 3 shows a schematic view illustrating a SAML DST response message according to an embodiment of the present invention which is the answer to a SAML DST request. The SAML DST response is illustrated in FIG. 3 is derived from a well-known SAML response type (StatusResponseType), ensuring that a response can contain a status, signature, etc.

The SAML DST response contains an element holding information about a subject name that should be used inside a retry request. This is needed in the case that subject identifiers are mapped by an Identity Provider in an ad hoc manner between domains. Moreover, the possibility to declare several DSTContainer elements within a SAML DST response is added.

Each DSTContainer element contains the response to the DST request as well as an identifier that can be used to refer to the service provider that issued the DST response. This identifier can for example be used by a requesting SP to contact a specific serving SP in case of unsuccessful or unexpected responses. It can further be used to indicate to a user which SPs responded how, e.g. in a distributed user profile management user interface.

It is noted that each serving SP will respond with exactly one DST response inside the DSTContainer element, since a SAML DST request contains exactly one DST request. The necessity to have several DSTContainer elements inside a SAML DST response is due to the requirement of having the Identity Provider accumulate several DST responses into one SAML DST response.

However, this requirement is only for the proxy mode illustrated in FIG. 4.

FIG. 4 is a sequence diagram showing example message flows for the case that the Identity Provider acts as a SAML DST proxy. SAML DST messages are used directly between requesting and serving SPs. However to decouple requesters and responders and provide cross-domain profile data management that respects a user's privacy, the Identity Provider is involved in the exchange of SAML DST messages. Therefore an extension to the Identity Provider is implemented and that is integrated into the message flow.

Illustrated in step 1.0 of FIG. 4, a user accesses SP-A by a given pseudonym. To query or manipulate the user's profile SP-A creates a SAML DST message with the user's pseudonym as subject and a DST message that affects specific data of the user. In step 1.2, SP-A sends the SAML DST message to the Identity Provider. Since the user's pseudonym is only valid within SP-A's domain, the Identity Provider creates a temporary pseudonym which will be valid at both the requesting and serving SPs. The Identity Provider then responds with a SAML DST retry message indicating the temporary pseudonym that should be used in the query. This is necessary if message signatures of SP-A are to be kept intact. An easier approach would be the Identity Provider exchanging pseudonyms inside the SAML DST message, but this would break the signature of SP-A. A serving SP would then only be able to validate the signature of the Identity Provider but not anymore that of the originating SP. This is not always a drawback, but it depends on the trust and business relationships among SPs.

In step 1.5 of FIG. 4, SP-A sends a new SAML DST message with the temporary pseudonym as subject. In step 1.6 the Identity Provider looks up which SPs can handle DST requests that affect the profile type specified in the incoming request. For example, if the DST request affects profiles of type urn:banking:profile:data, the Identity Provider looks up all banks that the user has a subscription with. This information has to be available to the Identity Provider which usually is established by a prior account federation step.

In step 1.7 of FIG. 4, the Identity Provider forwards the request to the first serving SP (SP-B) which first tries to resolve the temporary pseudonym from the request to a local user ID. This will identify the user's profile. The Identity Provider resolves the temporary ID as is customary in IdM scenarios. After that SP-B is processing the DST request and answers with a SAML DST response including the response to the DST request (step 1.11).

The Identity Provider repeats this procedure for all available SPs and accumulates the responses of each serving SP. Finally, (step 1.18) the Identity Provider returns a SAML DST response containing all the DST answers from the serving SPs. Additionally for each DST response, it includes an ID to identify the respective DST responder, i.e. the serving SP.

During the entire process, the Identity Provider can deny access to specific profile information or serving SPs according to access control policies defined by the user. Moreover, each serving SP has full control over the access to and modification of the profile information that it stores. Thus, each SP can make sure that only a limited subset or no information at all can be accessed.

By making use of metadata published by SPs—which is a common concept in Liberty Alliance's IdM solutions—it is possible for an Identity Provider or requesting SP to discover which profile data types an SP supports. A serving SP only has to specify the supported types of user profiles inside the published metadata. The profile types can simply be identified by the unique profile schema namespace which is also used to identify the profile type within SAML DST messages.

FIG. 5 shows sequence diagram illustrating example message flows for the case that the Identity Provider acts as discovery server for a requesting service provider to discover possible serving service providers. As prerequisite, the Identity Provider, the requesting SP and the serving data SP have a federation. Especially, the serving data SP has a repository of user information—account—and federated that account with the Identity Provider. I.e. there exists an account mapping identifier at the Identity Provider that the serving data SP can use to identify a local user data account.

In step 1.0 of FIG. 5, the Requesting SP sends a SAML DST request to the Identity Provider including the user's pseudonym as subject. The Identity Provider can check signatures to make sure the request is valid (step 1.1), find out which profile type will be subject to DST processing (step 1.2 and 1.3), find the SPs that can serve this kind of request for this specific user (step 1.4 and 1.5) and create a temporary pseudonym which can be used by serving SPs to identify the user. This would be established by nameID mapping.

The Identity Provider then exchange the subject of the SAML DST message with the temporary pseudonym and signs the message with its signature. Since changing the request breaks Requesting SP's signature, the Identity Provider sends a SAML DST response to Requesting SP containing the changed request and the endpoint URLs (Uniform Resource Locators) of the serving SPs that can serve that changed request and that have an established nameID mapping for the temporary pseudonym (step 1.9). The Identity Provider could have enforced access policies and e.g. have excluded certain SPs from the list of URLs.

Requesting SP would then re-sign the SAML DST request (it does so, because it trusts the Identity Provider) and send the request to one or several of the SPs that the requesting SP retrieved the contact URLs for. Each serving SP is then able to check both the signature of the Identity Provider and of Requesting SP. A serving SP would resolve the pseudonym to a local user ID, serve the DST request and respond with a SAML DST response to the Requesting SP.

Thereby, the load on the Identity Provider is smaller and the conversation between SPs is more direct. On the other hand, it takes the Identity Provider out of the message loop and thus reduces its abilities to enforce access rights. Furthermore, by handing out the endpoint URIs of the serving SAML DST SPs, a requesting SP is able to find out where a user has accounts. Although the requesting SP might identify a user only by a pseudonym, i.e. not his real identity, this might compromise the user's privacy.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for supporting management and exchange of distributed data of a user or an entity, in particular user profile information data, characterized in that a protocol is provided that employs SAML (Security Assertion Markup Language) as bearer protocol in such a way that SAML messages function as containers for DST (Data Service Template) or DST-like messages in order to compose SAML DST messages, wherein said DST or DST-like messages include data processing information, and wherein for said DST or DST-like messages unified protocol namespaces are defined as the protocol specific namespaces.

2. Method according to claim 1, wherein said SAML DST messages include an element functioning as container—container element—for carrying a single DST or DST-like message.

3. Method according to claim 1, wherein said SAML DST messages involve SAML DST request messages or SAML DST response messages.

4. Method according to claim 3, wherein a SAML DST request message includes a DST or DST-like request which is answered by a DST or DST-like response that is included in a SAML DST response message.

5. Method according to claim 3, wherein said SAML DST request messages include an element that functions as subject field for identifying the user or entity whose data is subject to the DST processing specified in the DST or DST-like message contained in said SAML DST request messages.

6. Method according to claim 3, wherein said SAML DST request messages include an element that functions as issuer field for identifying the originator of said SAML DST request messages.

7. Method according to claim 3, wherein said SAML DST request messages include an element that functions as recipient field for sending said SAML DST request messages to a specific destination, in particular a specific data service.

8. Method according to claim 4, wherein each of said SAML DST request messages includes one container element that constitutes said DST or DST-like request.

9. Method according to claim 4, wherein said DST or DST-like requests carry data processing information regarding the creation, modification, deletion or query of said distributed data.

10. Method according to claim 4, wherein the semantics of said DST or DST-like requests regarding said creation and/or deletion processing is constructed in such a way that the effect of said requests is limited solely to the creation and/or deletion of data within a data record.

11. Method according to claim 4, wherein each of said DST or DST-like requests includes a select statement, wherein said select statement holds an XPATH expression for indicating which part of said distributed data has to be processed.

12. Method according to claim 11, wherein said XPATH expression is handed on to the prospective recipient of said DST or DST-like requests.

13. Method according to claim 11, wherein a namespace being defined in said DST or DST-like requests and not being one of said protocol specific namespaces is used inside said XPATH expression for referencing elements of said distributed data.

14. Method according to claim 3, wherein said SAML DST response messages include an element that functions as status field indicating the status of said SAML DST response message.

15. Method according to claim 3, wherein said SAML DST response messages include an element that functions as retry subject field for holding information about a subject name that will be used inside a retry request.

16. Method according to claim 4, wherein each of said SAML DST response messages includes one or more container elements including said DST or DST-like responses.

17. Method according to claim 16, wherein said one or more container elements included by said SAML DST response messages include an identifier that is used for referring to the issuer of a DST or DST-like response.

18. Method according to claim 1, wherein said SAML DST messages include a signature element containing the result of signing said SAML DST messages.

19. Method according to claim 1, wherein said SAML DST messages are exchanged between requesting and serving service providers in order to manage said distributed data of said user or said entity.

20. Method according to claim 1, wherein an Identity Provider is involved in the exchange of said SAML DST messages between requesting and serving service providers.

21. Method according to claim 20, wherein said user or said entity accesses a service provider by a pseudonym identifier, wherein said Identity Provider is employed by service providers for resolving said pseudonym identifier and/or mapping it to the local user account.

22. Method according to claim 20, wherein a requesting service provider sends a SAML DST request message including said pseudonym identifier of said user or said entity as subject and a DST or DST-like message to said Identity Provider.

23. Method according to claim 20, wherein said Identity Provider creates a temporary pseudonym identifier being valid at both said requesting and said serving service providers.

24. Method according to claim 23, wherein said Identity Provider responds to said requesting service provider with a SAML DST retry message indicating said temporary pseudonym identifier.

25. Method according to claim 23, wherein said Identity Provider substitutes said pseudonym identifier for said temporary pseudonym identifier inside said SAML DST message.

26. Method according to claim 23, wherein said requesting service provider sends a new SAML DST request message including said temporary pseudonym as subject and said DST or DST-like message to said Identity Provider.

27. Method according to claim 20, wherein said Identity Provider looks up which service providers are able to serve said DST or DST-like requests that affect the type of said distributed data, in particular user profile information data, specified in said DST or DST-like requests and forwards said SAML DST request message to said serving service providers.

28. Method according to claim 20, wherein said serving service providers respond with SAML DST response messages to said Identity Provider, wherein said Identity Provider accumulates said DST or DST-like responses included in said SAML DST response messages of said serving service providers and returns a SAML DST response message containing said accumulated DST or DST-like responses to said requesting service provider.

29. Method according to claim 20, wherein said Identity Provider is used as discovery server for a requesting service provider to discover serving service providers,
wherein said Identity Provider checks the signature of a SAML DST request message sent from said requesting service provider,
wherein said Identity Provider looks up which service providers are able to serve said DST or DST-like requests that affect the type of said distributed data, in particular user profile information data, specified in said DST or DST-like requests,
wherein said Identity Provider creates a temporary pseudonym identifier,
wherein said Identity Provider substitutes the subject in said SAML DST request message for said temporary pseudonym—changed request—,
wherein said Identity Provider signs said changed request, and
wherein said Identity Provider sends a SAML DST response message containing said changed request and Uniform Resource Identifiers of said looked up serving service providers to said requesting service provider.

30. Method according to claim 29, wherein said requesting service provider re-signs said changed request and sends said re-signed changed request to said looked up serving service providers.

* * * * *

UNITED STATES PATENT AND TRADEMARK OFFICE
CERTIFICATE OF CORRECTION

PATENT NO. : 8,606,879 B2  Page 1 of 1
APPLICATION NO. : 13/256005
DATED : December 10, 2013
INVENTOR(S) : Winkler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 295 days.

Signed and Sealed this

Twenty-second Day of September, 2015

Michelle K. Lee
*Director of the United States Patent and Trademark Office*